United States Patent
Lim et al.

(10) Patent No.: US 9,288,613 B2
(45) Date of Patent: Mar. 15, 2016

(54) METHOD AND DEVICE FOR SELECTING A CHANNEL ACCORDING TO A DEVICE'S MOBILITY

(75) Inventors: Jaewon Lim, Gyeonggi-do (KR); Bonghoe Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 14/115,666

(22) PCT Filed: Apr. 5, 2012

(86) PCT No.: PCT/KR2012/002590
§ 371 (c)(1),
(2), (4) Date: Nov. 15, 2013

(87) PCT Pub. No.: WO2012/153917
PCT Pub. Date: Nov. 15, 2012

(65) Prior Publication Data
US 2014/0064252 A1      Mar. 6, 2014

Related U.S. Application Data

(60) Provisional application No. 61/483,076, filed on May 6, 2011.

(51) Int. Cl.
*H04W 4/00* (2009.01)
*H04W 72/04* (2009.01)
*H04W 84/18* (2009.01)

(52) U.S. Cl.
CPC ............ *H04W 4/008* (2013.01); *H04W 72/048* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2004/0255001 A1* | 12/2004 | Oh et al. ................... | 709/209 |
| 2005/0135379 A1* | 6/2005 | Callaway et al. ........ | 370/395.31 |
| 2007/0287476 A1 | 12/2007 | Jeong et al. | |
| 2008/0051099 A1* | 2/2008 | Moore et al. ................ | 455/454 |
| 2009/0163144 A1* | 6/2009 | Nakatsugawa ............. | 455/67.13 |

FOREIGN PATENT DOCUMENTS

| | | |
|---|---|---|
| EP | 1841115 A2 | 10/2007 |
| EP | 2227046 A1 | 9/2010 |
| KR | 10-2007-0105255 A | 10/2007 |

OTHER PUBLICATIONS

Written Opinion and International Search Report issued in corresponding International Patent Application No. PCT/KR2012/002590 dated Oct. 29, 2012.

* cited by examiner

*Primary Examiner* — Kouroush Mohebbi
(74) *Attorney, Agent, or Firm* — Morgan, Lewis & Bockius LLP

(57) ABSTRACT

The present invention relates to a method of selecting a channel, and more particularly, to a method of selecting a channel according to a Medical Wireless Body Area Network (MBAN) device's mobility, and of using same. The method includes: receiving, by a Medical Body Area Network (MBAN) master, a connection request signal including information on mobility from an MBAN device; transmitting, by the MBAN master, a connection response signal to the MBAN device in response to the received connection request signal; and allocating a channel for the MBAN device according to the information on mobility in the received connection request signal.

15 Claims, 2 Drawing Sheets

Fig. 1

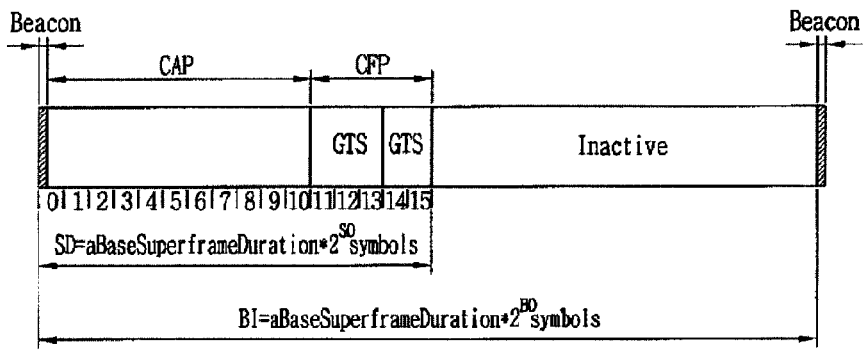

Fig. 2

| Octets:2 | 1 | 4/10 | 0/5/6/10/14 | 2 | variable | variable | variable | 2 |
|---|---|---|---|---|---|---|---|---|
| Frame Control | Sequence Number | Addressing Fields | Auxiliary Security header | SuperFrame Specification | GTS fields | pending address fields | Beacon Payload | FCS |
| MHR | | | | MAC Payload | | | | MFR |

Fig. 3

| Frame Control | Sequence Number | Addressing fields | Auxiliary Security Header | Command Frame identifier | Capability Information |
|---|---|---|---|---|---|
| 2 | 1 | 8/20 | 0/5/6/10/14 | 1 | 1 |

Octets:

Fig. 4

| Alternate PAN Coordinator | Device Type | Power Siurce | Receiver On When idle | Reserved | Security Capability | Allocate Address |
|---|---|---|---|---|---|---|
| 0 | 1 | 2 | 3 | 4-5 | 6 | 7 |

Bit No.

Fig. 5

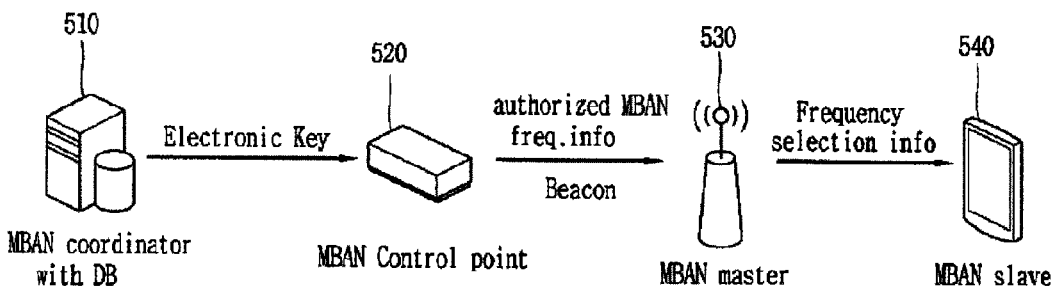

METHOD AND DEVICE FOR SELECTING A CHANNEL ACCORDING TO A DEVICE'S MOBILITY

TECHNICAL FIELD

The present invention relates to a channel selection, and more particularly, to a method of selecting and using a channel in accordance with mobility of MBAN (medical wireless body area network) device and apparatus therefor.

BACKGROUND ART

Owing to the ongoing development of mobile environments, it becomes unnecessary for a patient to go to the doctor. Instead, a patient's status is monitored anytime and anywhere and the monitored information is then forwarded to a hospital by real time to provide the patient with an appropriate medical service. Thus, as the appropriate medical services can target ordinary people to manage user's health anytime and anywhere. This U-health network industry is rising as a new growth industry and can provide each individual with sustainably safe life as well as with convenience, comfortableness, time saving, cost reduction and the like.

MBAN (medical wireless body area network) can be sorted into In-body type for monitoring a device implanted in a human body from an outside of the human body due to in-body propagation property and On/Out-body short-range communication type for monitoring a device attached to or provided outside a human body to detect an effect generated from a human body surface or around a human body in 3 to 5 meters.

MICS (medical implant communications system) of the in-body type provides interactive digital communications between active medical implant transceivers provided in and out of a human body. Currently, millions of people live by depending on the active medical implant devices globally. And, the active medical implant devices cover a wide scope of medical treatment functions including heartbeat control, pain control, medication, urinary incontinence control, diabetic insulin control device, implanted medication injection device and the like.

MBAN system is devised to provide a flexible platform for wireless networking of a multitude of sensors used to monitor patient's physiological data in health care facility such as a hospital and the like. The MBAN system operates on 2,360~2,400 MHz. Maximum emission bandwidth is limited to 5 MHz. Transmission power amounts to a smaller one of 1 mW and 10*log(B) dBm in case of operation on 2,360~2,390 MHz. In this case, 'B' indicates 20-dB emission bandwidth. In case of operation on 2,390~2,400 MHz, a smaller one of 20 mW and 10*log(B) dBm is used as a transmission power. In this case, 'B' indicates 20-dB emission bandwidth.

2,360~2,400 MHz corresponds to a frequency band assigned for another wireless communication system in advance. And, the MBAN system operates on a secondary basis based on cognitive radio. In particular, harmful interference should not be caused to a primary user and interference generated form the primary user should be accepted in use.

To this end, in case of operation on a band of 2,360~2,390 MHz in MBAN, MBAN devices (or terminals) should basically operate in an indoor space of a registered health care facility. A use of 2,360~2,390 MHz should be controlled through cooperation with a primary user. When the primary user uses the corresponding band, all operations on this band should be initialized and an operation should be resumed using a new band of 2,390~2,400 MHz.

When MBAN devices move outside, they should stop operating or perform transmissions by changing a transmission band into the 2,390~2,400 MHz band used as a basic band. In case of operating on 2,390~2,400 MHz, the MBAN devices are usable irrespective of an indoor space or an outdoor space. Therefore, in order to use a channel efficiently, it is necessary to select a channel according to mobility of an MBAN device.

DISCLOSURE OF THE INVENTION

Technical Task

Accordingly, one object of the present specification is to provide a method of selecting a channel and apparatus therefor, by which efficiency of channel use in MBAN system can be maximized.

Technical Solution

To achieve these and other advantages and in accordance with the purpose of the present invention, as embodied and broadly described, a method of assigning a channel according to mobility of an MBAN (medical body area network) device according to one embodiment of the present invention may include receiving, by an MBAN master, an association request signal including information about the mobility from an MBAN device, transmitting, by the MBAN master, an MBAN device association response signal in response to the received association request signal, and assigning the channel for the MBAN device according to the information about the mobility included in the received association request signal.

Preferably, the MBAN may include WPAN (wireless personal area network). And, the receiving of the association request signal including the information about the mobility may use a capability information field.

Preferably, in the assigning of the channel for the MBAN device, the information about the mobility of the MBAN device may include at least one of fixed, semi mobile and mobile.

Preferably, in the assigning of the channel for the MBAN device, if the information about the mobility of the MBAN device is fixed, the MBAN master may assign all of time in which a primary user does not use a corresponding specific MBAN channel, or a time longer than that of a mobile MBAN device.

Preferably, in the assigning of the channel for the MBAN device, if the information about the mobility of the MBAN device is mobile, the MBAN master may make channel selection information included in a beacon of IEEE 802.15.4 or periodically a frame including transmit channel selection information to the MBAN device by unicast.

Preferably, in the assigning of the channel for the MBAN device, if the information about the mobility of the MBAN device is semi-mobile, channel selection information may be included in a beacon of IEEE 802.15.4 or a frame including channel selection information may be periodically transmitted to the MBAN device by unicast.

Preferably, in the assigning of the channel for the MBAN device, periodicity of transmitting frame information including channel selection information is set longer than that of transmitting the channel selection information to the mobile device.

To further achieve these and other advantages and in accordance with the purpose of the present invention, a method of assigning a channel according to mobility of an MBAN device may include transmitting, by the MBAN device, an association request signal including information about the mobility to an MBAN master, receiving, by the MBAN device, an MBAN device association response signal from the MBAN master in response to the transmitted association request signal, receiving information about the channel assigned by the MBAN master according to the information about the mobility included in the transmitted association request signal from the MBAN master, and transceiving data with the MBAN master using the assigned channel.

Preferably, the transmitting of the association request signal including the information about the mobility may use a capability information field.

Preferably, in the receiving of the assigned channel information from the MBAN master, the information about the mobility of the MBAN device may include at least one of fixed, semi mobile and mobile.

Preferably, in the receiving of the assigned channel from the MBAN master, if the information about the mobility of the MBAN device is fixed, the MBAN master may assign all of time in which a primary user does not use a corresponding specific MBAN channel, or a time longer than that of a mobile MBAN device.

Preferably, in the receiving of the assigned channel from the MBAN master, if the information about the mobility of the MBAN device is mobile, channel selection information may be included in a beacon of IEEE 802.15.4 or a frame including channel selection information may be periodically received from the MBAN master by unicast.

Preferably, in the receiving of the assigned channel from the MBAN master, if the information about the mobility of the MBAN device is semi-mobile, channel selection information may be included in a beacon of IEEE 802.15.4 by the MBAN master or a frame including channel selection information may be periodically received from the MBAN master by unicast.

Preferably, in the receiving of the assigned channel from the MBAN master, periodicity of receiving frame information including channel selection information from the MBAN master may be set longer than that of receiving the channel selection information by the mobile device.

Advantageous Effects

In a method of selecting a channel in accordance with mobility of an MBAN device in an MBAN system according to one embodiment disclosed in this specification, as mentioned in the foregoing description, communications can be performed while maximizing efficiency in using the channel for the MBAN device.

DESCRIPTION OF DRAWINGS

FIG. 1 shows a frame structure of IEEE 802.15.4 according to a related art disclosed in this specification.

FIG. 2 shows a format of a beacon frame of IEEE 802.15.4 according to a related art disclosed in this specification.

FIG. 3 shows a frame format of an association request command of IEEE 802.15.4 according to a related art disclosed in this specification.

FIG. 4 shows a frame format of a capability information field of IEEE 802.15.4 according to a related art disclosed in this specification.

FIG. 5 is a block diagram of a connected structure of primary components of MBAN and contents of transmitted information according to one embodiment disclosed in this specification.

BEST MODE FOR INVENTION

Figure 6:
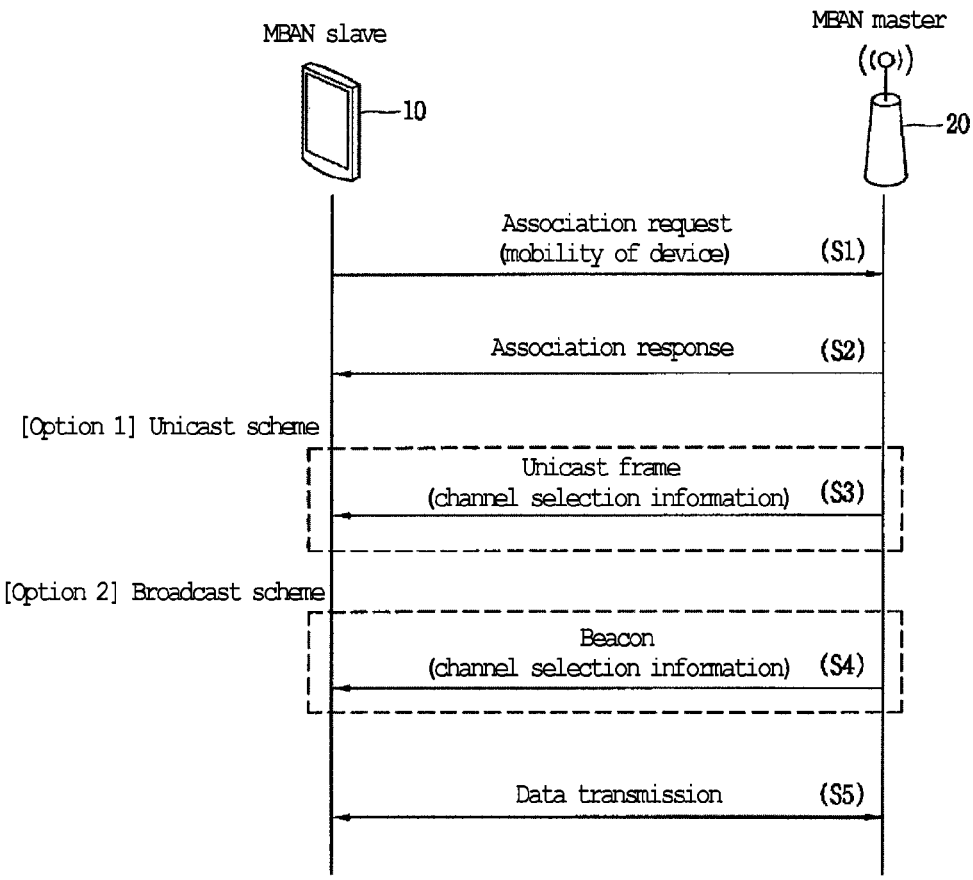
FIG. 6 is a signaling flowchart of a process for selecting a channel between an MBAN master and an MBAN device according to mobility of the MBAN device according to one embodiment disclosed in this specification.

First of all, various modifications and variations can be made in the present invention without departing from the spirit and scope of the invention. Reference will now be made in detail to the preferred embodiments of the present invention, examples of which are illustrated in the accompanying drawings. Thus, it is intended that the present invention covers the modifications and variations of this invention that come within the scope of the appended claims and their equivalents, instead of limiting the present invention to a specific embodiment.

A terminology including an ordinal number as $1^{st}$, $2^{nd}$ and the like used in this specification may be usable to describe various components. Yet, each of the components should be non-limited by the terminology including the ordinal number. The terminology including the ordinal number is used only to discriminate one component from another. For instance, a $1^{st}$ component may be named a $2^{nd}$ component without departing from the scope of the appended claims and their equivalents. Similarly, a $2^{nd}$ component may be named a $1^{st}$ component for example. A terminology 'and/or' may include a combination of a plurality of related and disclosed items or a prescribed one of a plurality of the related and disclosed items.

When a prescribed component is mentioned as 'connected to' or 'accessed by' a different component, it may be directly connected to or accessed by the different component. Yet, another different component may exist in-between. On the contrary, when a prescribed component is mentioned as 'directly connected to' or 'directly accessed by' a different component, it is understood that another different component does not exist in-between.

Terminologies used in the present application are used to describe a specific embodiment only, by which the present invention may be non-limited. A singular representation used in this specification may include a plural representation unless apparently different in the context of usage. In the present application, such a terminology as 'include', 'have' and the like is intended to just designate the presence of features, numerals, steps, operations, components, parts and combinations thereof, which are disclosed in a specification, and should be understood as not excluding the presence or addition possibility of at least one or more features, numerals, steps, operations, components, parts and combinations thereof in advance.

Unless defined different, all terminologies, used herein, including technical and/or scientific terminologies have the meanings generally understood by those skilled in the art to which the present invention pertains. Moreover, a general terminology used by the present invention should be construed as the definition in dictionary or in accordance with the context and should not be construed as an excessively reduced meaning.

Reference will now be made in detail to the preferred embodiments of the present invention, examples of which are illustrated in the accompanying drawings. In the following detailed description of the invention includes details to help the full understanding of the present invention. Wherever possible, the same reference numbers will be used throughout the drawings to refer to the same or like parts and redundant description shall be omitted.

FIG. 1 shows a frame structure of IEEE 802.15.4 according to a related art disclosed in this specification.

In IEEE 802.15.4 LR-WPAN (low power-wireless personal area networks), a coordinator periodically broadcasts a beacon frame to a device inside a network or a network device. According to the standard, an interval between a beacon frame and a beacon frame is defined as a super frame. The super frame carries data by being divided into CAP (contention access period) and CFP (contention free period).

The super frame starts with a beacon of a coordinator of a PAN (personal area network) coordinator and a BI (beacon interval) is divided into an active interval and an inactive interval. A beacon frame does not carry a beacon if a use of each super frame is not wanted. Yet, in case of using a beacon frame, a beacon is used to synchronize devices, identify a PAN, and describe a super frame structure.

The active interval (i.e., Superframe Duration (SD)) is divided into 16 superframe slots in equal size and is configured with CAP operating as slotted CSMA/CA (carrier sense multiple access/collision detect) and CFP operating as GTS (guaranteed time slot). During the inactive interval (i.e., Beacon Interval (BI)), the coordinator can enter a low-power mode.

The BI and SD shown in FIG. 1 can be configured by setting BO (beacon order) and SO (superframe order) of PIB (PAN information base). LT-WPAN uses two kinds of channel access mechanisms (i.e., a beacon non-use PAN and a beacon use PAN) for a configuration of a network. In this case, the beacon use PAN uses a slotted CSMA/CSA channel access mechanism.

A device having transmission data randomly selects a value of backoff or delay time in a range $[0, 2^{BE}-1]$. In this case, the BE is an exponent for the backoff and its value indicates a range for the backoff selection. In case of attempting to transmit a frame in CAP (contention access period), each device stands by for a randomly selected slot. If a channel is in busy state, the corresponding device selects another random backoff value and then stands by for the selected value. If a channel is in idle state, a device attempting a transmission can perform the transmission on a next backoff slot boundary.

CSM/CA algorithm is used before a transmission of data or MAC command frame transmitted in CAP. Otherwise, the frame is transmitted right after ACK of a data request command. In the beacon use PAN, the CSM/CA algorithm is not used for a transmission of a beacon frame, a transmission of ACK frame or data frame transmitted in CFP.

FIG. 2 shows a format of a beacon frame of IEEE 802.15.4 according to a related art disclosed in this specification.

In a beacon interval, a coordinator broadcasts a beacon frame including various kinds of network parameters such as synchronization information and the like to the rest of devices. In CAP, each device transmits such a frame as an access request and the like. In doing so, a channel access for the frame transmission is performed through contention between devices.

In CFP configured with a multitude of guaranteed time slots (GTSs), a specific device transmits a data frame and the like in GTS assigned by a coordinator device without contention with other devices. In an idle period, all devices including the coordinator device enter a power save mode and frame transmissions are not performed between the coordinator device and other devices.

Thus, according to IEEE 802.15.3 specifications or IEEE 802.15.4 specifications, in order to receive a beacon frame from a coordinator device, a receiving end (Rx) of each device should be awake in a beacon interval of a superframe at least. In particular, each device should be awake in each superframe interval, i.e., each beacon interval once at least. This is to share overall information of a network through a beacon frame as well as information about a superframe.

Referring to FIG. 2, a format of a beacon frame can include a format of MHR (MAC header) including a frame control field, a sequence number field, a source address field, an auxiliary security header and the like.

Moreover, the format of a beacon frame can further include a format of MAC payload including a superframe specification field, a GTS (guaranteed time slot) field, a pending address field, a beacon payload and the like and a format of MFR (MAC footer) including FCS (frame check sequence).

FIG. 3 shows a frame format of an association request command of IEEE 802.15.4 according to a related art disclosed in this specification.

In order for a node to join WPAN, a node registration procedure by a manager is necessary. To this end, an authentication certificate issued by a reliable authentication organization of a third party is used. Assume that every node is provided by a manufacturer with a unique identifier, information of a device and a pair of a secret key and a public key and then authenticated by the reliable authentication organization of the third party. A PAN coordinator receives such information from a node to be joined, performs validation, and is then able to determine whether to register the node actually according to a selection made by the manager.

After a beacon signal has been transceived between the node and the PAN coordinator, the node make a request for association to the PAN by sending an association request command and the authentication certificate of the node. The authentication certificate of the node includes an identifier of the node, a public key of the node, a data code containing node information, a signature of the authentication organization and the like and is transmitted together with a signature of a device. Having received them, the PAN coordinator can validate the authentication certificate and the signature using the public key of the device obtained from the authentication certificate.

After completion of the validation of the authentication certificate and signature, the manager checks the information of the device of the node and then determines whether to register the node. If the manager determines the registration of the node, the PAN coordinator transmits an association response command to approve the join of the node and saves the authentication certificate and signature of the node.

Meanwhile, an association request command can request a device to be connected to a PAN through a PAN coordinator or a coordinator. This command can be transmitted by a device not connected to the PAN currently only. The device can be connected to the PAN only through the PAN coordinator or a coordinator allowed to be connected by being determined through a scan procedure. Although an RFD (reduced function device) is not requested to receive an association request command, every device can transmit an association request command.

Referring to FIG. 3, the association request command can be represented in a format including an MHR (MAC header) including a frame control field, a sequence number field, a source address field, an auxiliary security header and the like, a command frame identifier, and capability information.

FIG. 4 shows a frame format of a capability information field of IEEE 802.15.4 according to a related art disclosed in this specification.

Referring to FIG. 4, the capability information field mentioned in the foregoing description with reference to FIG. 3 may further include a PAN coordinator selection (alternate PAN coordinator) subfield, a device type subfield, a power source subfield, a receiver on when idle subfield, a reserved subfield, a security capability subfield, an allocate address subfield and the like.

The alternate PAN coordinator subfield has 1-bit length. If a device can become a PAN coordinator, this subfield is set to 1. Otherwise, this subfield is set to 0 (zero). The device type subfield has 1-bit length. If a device is configured as FDD (full-function device), this subfield is set to 1. Otherwise, i.e., if this field indicates an RFD (reduced function device), it is set to zero.

The power source subfield has 1-bit length. If a device is receiving a power not from a main power source but from another place, this subfield is set to 1. Otherwise, this subfield is set to zero. The receiver on when idle subfield is set to 1 if a reliever power of a device is not disabled to reserve a power from a receiver during an idle period. Otherwise, this subfield is set to zero.

The security capability subfield has 1-bit length. If a device is able to transmit or receive a protected MAC frame cryptographically, this subfield is set to 1. Otherwise, this subfield is set to zero. The allocate address subfield has 1-bit length. If a device wants a coordinator to allocate a short 16-bit address as a result of an association procedure, this subfield is set to 1. Otherwise, this subfield is set to zero.

FIG. 5 is a block diagram of a connected structure of primary components of MBAN and contents of transmitted information according to one embodiment disclosed in this specification.

FIG. 5 shows a connected structure of primary components of MBAN and contents of transmitted information. In particular, if an MBAN coordinator 510, which manages a database (DB) including information indicating when channels on 2,360~2,390 MHz band are effective, delivers the corresponding information to an MBAN control point 520 through an electronic key, the MBAN control point delivers an authorized MBAN frequency information to an MBAN master 530 through a beacon information.

The MBAN master 530 schedules a frequency, which is to be assigned to a device, based on the authorized MBAN frequency information delivered to the MBAN master 530 and then delivers it to an MBAN slave device 540 through a frequency selection information, thereby enabling the MBAN slave device 540 to communicate with the MBAN master 530 through an MBAN channel designated to the MBAN slave device 540.

In the following description, an MBAN slave device (slayer) shall be named an MBAN device (or terminal).

FIG. 6 is a signaling flowchart of a process for selecting a channel between an MBAN master and an MBAN device according to mobility of the MBAN device according to one embodiment disclosed in this specification.

Referring to FIG. 6, a method of selecting a channel between an MBAN master and an MBAN device (or terminal) in accordance with mobility of the MBAN device includes a step S1 for an MBAN to perform an association request, a step S2 for an MBAN master 20 to perform an association response in response to the association request, steps S3 and S4 for the MBAN master to select a channel between the MBAN master and the MBAN device (or terminal) in accordance with mobility of the MBAN device, and a step S5 of transmitting data on the selected channel.

In the following description, a process for a representative CM to allocate a resource in central type topology is explained in detail with reference to FIG. 6.

FIG. 6 shows a process for selecting a channel selection method between an MBAN master 20 and an MBAN device 10 according to mobility of the MBAN device proposed in this specification. In an association step, the MBAN device 20 transmits an association request frame including information indicating its mobility to the MBAN master 20 [S1].

A value of the mobility of the MBAN device 10 may have one of three kinds of values 'fixed', 'semi-mobile' and 'mobile'. The MBAN device having the fixed value is installed on a place and then used by being fixed to the corresponding place. The MBAN device having the mobile value is an MBAN device having frequency mobility. And, the semi-mobile MBAN device is mobile but has a mobility frequency lower than that of the mobile MBAN device.

Having received the association request frame from the MBAN device 10, the MBAN master 20 transmits an association response frame to the MBAN terminal [S2].

Subsequently, if the mobility of the MBAN device (or terminal) 10 is 'fixed', since the corresponding MBAN device has no mobility and is communicating with the MBAN master only at a currently located place, the MBAN master 20 is able to assign all of time in which a primary user does not use a corresponding specific MBAN channel, or a time relatively longer than that of a mobile MBAN terminal to the MBAN terminal.

In this case, the MBAN master 20 can deliver channel selection information to the MBAN terminal using a unicast frame transmitted to a specific recipient like the case of Option 1 shown in FIG. 6 [S3]. Moreover, if it is expected that the MBAN master 20 will communicate with a fixed MBAN device only, the MBAN master 20 operates by the non-beacon scheme of IEEE 802.15.4, thereby reducing system overhead due to a transmission of a beacon frame.

In case that the mobility of the MBAN device (or terminal 10 is 'mobile', the MBAN master 20 periodically transmits channel assignment information to the MBAN terminal and checks whether the corresponding MBAN terminal is located within a transmission range of the MBAN master 20. In doing so, the MBAN terminal periodically checks the channel assignment information transmitted from the MBAN master and checks whether the MBAN terminal currently receives a service from the same MBAN master.

If the MBAN terminal 10 confirms that it enters a transmission range of a new MBAN master, the MBAN terminal 10 needs to access the new MBAN master by performing the association procedure again. In case of expecting an access of a mobile MBAN device, the MBAN master makes channel selection information included in a beacon of IEEE 802.15.4 (Option 2) [S4] or can periodically transmit a frame including channel selection information to the MBAN device by unicast (Option 1) [S3].

If the mobility of the MBAN terminal (or device) 10 is 'semi-mobile', the MBAN master makes channel selection information included in a beacon of IEEE 802.15.4 (Option 2) [S4] or periodically transmits a frame including channel selection information to the MBAN device by unicast. In doing so, the periodicity for transmitting the channel selection information included information may be set longer than that for transmitting the channel selection information to the mobile terminal.

In the following description, a mobility parameter of a specific MBAN device is defined and a protocol and frame structure for delivering the mobility parameter are proposed.

Figure 7:
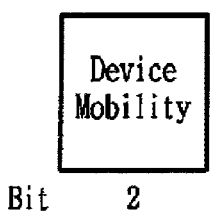
FIG. 7 shows attributes of an MBAN device to illustrate mobility of the MBAN device according to one embodiment disclosed in this specification.

FIG. 7 shows attributes of an MBAN device to illustrate mobility of the MBAN device according to one embodiment disclosed in this specification.

FIG. 7 shows mobility attribute of an MBAN device to indicate terminal mobility proposed by the present specification. The attribute for MBAN mobility (i.e., mobility attribute) is represented as a 2-bit value. If a bit value indicating a binary value is 00, it indicates 'fixed'. If the bit value is 01, it indicates 'semi-mobile'. If the bit value is 10, it indicates 'mobile'. If the bit value is 11, it is reserved for the extension in the future.

Figure 8:
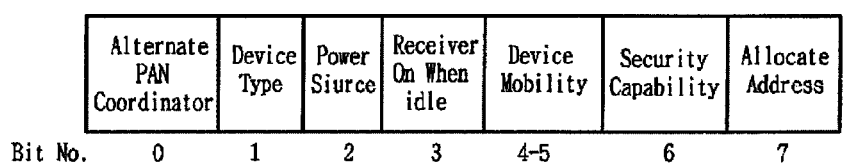
FIG. 8 shows one example of applying a mobility attribute for mobility of an MBAN device according to one embodiment disclosed in this specification to a capability information field of the existing IEEE 802.15.4.

FIG. 8 shows one example of applying a mobility attribute for mobility of an MBAN device according to one embodiment disclosed in this specification to a capability information field of the existing IEEE 802.15.4.

Referring to FIG. 8, a capability information field shown in FIG. 8 plays a role in informing an MBAN master of capability of a device by being included in an association request transmitted to the MBAN master by an MBAN device (or terminal). In this case, shown is one example of applying mobility attribute proposed by the present specification using $4^{th}$ and $5^{th}$ bits of a reserved field of the existing capability information field of IEEE 802.15.4.

The terminal described so far can be generally named a device and includes every terminal capable of implementing the embodiments shown in FIGS. 2 to 8. In particular, a terminal according to the present invention, i.e., a device inclusively includes one of a mobile communication terminal (e.g., a user equipment (UE), a cellular phone, a DMB phone, a DVB-H phone, a PDA phone, a PTT phone, etc.) capable of implementing the above-described technical idea of the present invention, a digital TV, a GPS navigation system, a portable game player, an MP3, other home appliances and the like.

Moreover, a terminal according to the present invention includes software for implementing the embodiments shown in FIGS. 1 to 8 or a module on which the software is installed. This module is one component of the terminal and may be named a processor or controller. A terminal according to the present invention includes mandatory hardware and software components necessary for implementing the above-described technical features of the present invention.

The above-described method according to the present invention may be implemented by software, hardware or combination of software and hardware. For instance, a method according to the present invention may be saved in a storage medium (e.g., an internal memory, a flash memory, a hard disk, etc.) and may be implemented with codes or commands in a software program executable by a processor (e.g., a microprocessor, etc.).

So far, apparatus and method according to at least one embodiment disclosed in the present specification are described with reference to the accompanying drawings, by which the present specification may be non-limited. And, it is a matter of course that various modifications can be performed by those skilled in the art, to which the present invention pertains, within the scope of the technical idea of the present invention.

Regarding the above-described channel selecting method according to mobility of an MBAN device, configurations and methods of the above-described embodiments are not limitedly applicable but the embodiments can be configured in a manner of being selectively combined entirely or in part to enable various modifications of the embodiments.

So far, the embodiments disclosed in the present specification are described with reference to the accompanying drawings.

In this case, terminologies or vocabularies used in the present specification and the claims should be construed as the meanings and concepts matching the technical idea disclosed in the present specification instead of being limited to the general or dictionary definition.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of assigning a channel according to mobility of a medical body area network (MBAN) device in an MBAN network, the method comprising:
   receiving, by an MBAN master from the MBAN device, an association request signal including information about the mobility of the MBAN device;
   transmitting, by the MBAN master to the MBAN device, an association response signal in response to the received association request signal; and
   transmitting, by the MBAN master to the MBAN device, channel assignment information according to the information about the mobility included in the received association request signal,
   wherein, when the information about the mobility of the MBAN device indicates that the MBAN device is a fixed device, the channel assignment information is transmitted to the MBAN device once through a non-beacon frame, and
   wherein, when the information about the mobility of the MBAN device indicates that the MBAN device is a mobile device, the channel assignment information is transmitted to the MBAN device periodically through a beacon frame.

2. The method of claim 1, wherein the MBAN comprises a wireless personal area network (WPAN).

3. The method of claim 1, wherein the association request signal further includes a capability information field.

4. The method of claim 1, wherein, when the information about the mobility of the MBAN device indicates that the MBAN device is a fixed device, all of time that a primary user does not use is assigned to the MBAN device.

5. The method of claim 1, wherein a time interval assigned for the MBAN device when the information about the mobility of the MBAN device indicates that the MBAN device is a fixed device is longer than a time interval assigned for the MBAN device when the information about the mobility of the MBAN device indicates that the MBAN device is a mobile device.

6. The method of claim 1, wherein the beacon frame is broadcast and the non-beacon frame is unicast.

7. The method of claim 1, wherein, when the information about the mobility of the MBAN device indicates that the MBAN device is a mobile device having a low mobility frequency, periodicity of transmitting the channel assignment information is set longer.

8. A method of assigning a channel according to mobility of a medical body area network (MBAN) device in an MBAN network, the method comprising:

transmitting, by the MBAN device to an MBAN master, an association request signal including information about the mobility of the MBAN device;

receiving, by the MBAN device from the MBAN master, an association response signal in response to the transmitted association request signal;

receiving, by the MBAN device from the MBAN master, channel assignment information according to the information about the mobility included in the transmitted association request signal, wherein, when the information about the mobility of the MBAN device indicates that the MBAN device is a fixed device, the channel assignment information is received from the MBAN master once through a non-beacon frame, and wherein, when the information about the mobility of the MBAN device indicates that the MBAN device is a mobile device, the channel assignment information is received from the MBAN master periodically through a beacon frame.

9. The method of claim 8, wherein the association request signal further includes a capability information field.

10. The method of claim 8, wherein, when the information about the mobility of the MBAN device indicates that the MBAN device is a fixed device, all of time that a primary user does not use is assigned to the MBAN device.

11. The method of claim 8, wherein a time interval assigned for the MBAN device when the information about the mobility of the MBAN device indicates that the MBAN device is a fixed device is longer than a time interval assigned for the MBAN device when the information about the mobility of the MBAN device indicates that the MBAN device is a mobile device.

12. The method of claim 8, wherein the beacon frame is broadcast and the non-beacon frame is unicast.

13. The method of claim 8, wherein, when the information about the mobility of the MBAN device indicates that the MBAN device is a mobile device having a low mobility frequency, periodicity of receiving the channel assignment information is set longer.

14. An apparatus configured to assign a channel according to mobility of a medical body area network (MBAN) device in an MBAN network, the apparatus comprising:

a memory device; and a processor operatively connected to the memory device and configured to:

receive, from the MBAN device, an association request signal including information about the mobility of the MBAN device;

transmit, to the MBAN device, an association response signal in response to the received association request signal; and transmit, to the MBAN device, channel assignment information according to the information about the mobility included in the received association request signal, wherein, when the information about the mobility of the MBAN device indicates that the MBAN device is a fixed device, the channel assignment information is transmitted to the MBAN device once through a non-beacon frame, and wherein, when the information about the mobility of the MBAN device indicates that the MBAN device is a mobile device, the channel assignment information is transmitted to the MBAN device periodically through a beacon frame.

15. An apparatus configured to assign a channel according to mobility of the apparatus in a medical body area network (MBAN) network, comprising:

a memory device; and a processor operatively connected to the memory device and configured to:

transmit, to an MBAN master, an association request signal including information about the mobility of the apparatus;

receive, from the MBAN master, an association response signal in response to the transmitted association request signal;

receive, from the MBAN master, channel assignment information according to the information about the mobility included in the transmitted association request signal, wherein, when the information about the mobility of the apparatus indicates that the apparatus is a fixed device, the channel assignment information is received from the MBAN master once through a non-beacon frame, and wherein, when the information about the mobility of the apparatus indicates that the apparatus is a mobile device, the channel assignment information is received from the MBAN master periodically through a beacon frame.

* * * * *